(12) United States Patent
Schneider

(10) Patent No.: US 6,901,581 B1
(45) Date of Patent: May 31, 2005

(54) METHOD FOR SOFTWARE DEBUGGING VIA SIMULATED RE-EXECUTION OF A COMPUTER PROGRAM

(75) Inventor: Eric D. Schneider, Plymouth, MN (US)

(73) Assignee: Eridon Corporation, Shorewood, MN (US)

( * ) Notice: Subject to any disclaimer, the term of this patent is extended or adjusted under 35 U.S.C. 154(b) by 430 days.

(21) Appl. No.: 10/263,496

(22) Filed: Oct. 2, 2002

(51) Int. Cl.[7] .................................................. G06F 9/44
(52) U.S. Cl. ..................................................... 717/124
(58) Field of Search ............................... 717/124–135; 703/13, 22

(56) References Cited

U.S. PATENT DOCUMENTS

| | | | | |
|---|---|---|---|---|
| 5,812,414 | A | * | 9/1998 | Butts et al. .................... 716/16 |
| 6,609,247 | B1 | * | 8/2003 | Dua et al. ..................... 717/128 |
| 6,658,416 | B1 | * | 12/2003 | Hussain et al. ................ 707/10 |
| 6,728,949 | B1 | * | 4/2004 | Bryant et al. ................. 717/127 |
| 6,751,789 | B1 | * | 6/2004 | Berry et al. .................. 717/130 |
| 6,754,890 | B1 | * | 6/2004 | Berry et al. .................. 717/128 |
| 6,766,511 | B1 | * | 7/2004 | Berry et al. .................. 717/128 |
| 6,804,814 | B1 | * | 10/2004 | Ayers et al. .................. 717/135 |

OTHER PUBLICATIONS

Emrath et al. Detecting Nondeterminancy in Parallel Programs. IEEE.*
Wagenen et al. Achieving Reliability in Simulation Software. IEEE. 1994.*
Vraken et al. Debug Facilities in the TriMedia CPU64 Architecture. IEEE. 1999.*
Cooper et al. The ParaScope Parallel Programming Environement. IEEE. 1993.*

* cited by examiner

*Primary Examiner*—Wei Y. Zhen
(74) *Attorney, Agent, or Firm*—Martine Penilla & Gencarella, LLP

(57) ABSTRACT

An invention is provided for debugging a computer program. Program information is recorded in a trace buffer. The program information generally includes write accesses from the computer program and the execution path of the computer program. In addition, a memory image snapshot of at least a portion of memory being utilized by the computer program is captured. Simulated re-execution of the computer program then occurs by adjusting the state of the memory image snapshot based on the program information. Further, debugging logic can be inserted into a simulated re-execution at particular points in the computer program. In particular, the debugging logic does not change the trace buffer or the memory image snapshot, and as such, do not alter the captured sequence events being debugged.

20 Claims, 8 Drawing Sheets

METHOD FOR SOFTWARE DEBUGGING VIA SIMULATED RE-EXECUTION OF A COMPUTER PROGRAM

BACKGROUND OF THE INVENTION

1. Field of the Invention

This invention relates generally to computer software, and more particularly to computer software debugging via simulated re-execution.

2. Description of the Related Art

When programming computers, there are often errors, at least initially, in a computer program such that the program produces unexpected results. These errors are often referred to as "bugs." It is through the process of debugging that these bugs are eliminated. In some cases, in order to recognize and correct a bug, a programmer simply needs to observe the unexpected results. The programmer then studies the source code to determine what might have caused the unexpected behavior, and corrects (re-codes) the appropriate parts of the program.

However, often, the events leading up to observing a "failure" are complex in nature and not fully "told" by observing the failure. For example, if the computer crashes every time a user selected "Print" in an application, a programmer may be able to examine the code relating to printing and deduce the coding error. On the other hand, if the computer crashes at seemingly random points, a programmer would start by asking for more details surrounding a crash. It is not uncommon for a "crashed" program to generate a type of core (memory) dump and/or log of events. As can be appreciated, debugging a program becomes very difficult when a bug occurs intermittently. That is, when an unexpected behavior occurs at random times that cannot predictably be reproduced.

A traditional method of debugging involves the use of a trace buffer, where events performed by the computer during a certain window of time are captured. The programmer sets up a trigger to freeze the window when the bug or situation of interest occurs. Trace buffers generally are included as part of an emulator, which can physically replace a target computer's central processing unit (CPU). The emulator performs the same operations as the original CPU, but adds specialized debugging abilities, such as trace buffers, single step, examine memory, etc. Trace buffers typically capture bus cycles (access) and are presented as CPU instructions and/or data (variable) access, which can be correlated with the originating source.

However, complex bugs can involve, for example, a mistake A, which leads to another mistake B, which leads to another mistake C, and then finally results in some behavior D, which was originally observed as the bug. The process of understanding the observed bug is one of coming to understand that the behavior (D) was caused by an unexpected behavior C, which was the result a unexpected behavior B, which itself was the result of unexpected behavior A for which the programmer sees an explanation in an error in coding the program. Generally, trace buffers hold a small snapshot (window) of time. As a result, the process of debugging involves triggering on the first observed bug D, examining the trace buffer to realize this was the result of a prior unexpected behavior, and re-triggering and regenerating the bug to capture events surrounding the unexpected behavior C, and so on.

With memory costs coming down, it is possible to have very large trace buffers that store hundreds of thousands of events. In fact, the embodiments of present invention envision trace buffers that hold billions of events. Unfortunately, with such a large amount of storage capacity, it is extremely difficult for someone to look through so much information. Providing a "find" operation, similar to searching a text document for the occurrence of a particular word, is useful but limited. The problem is that events occur within a context, which is to say, the state of the system—the current image of RAM that holds all the variables.

In debugging, when one finds some variable is incorrectly set, it is often important to know states of other variables. Further, complex data structures involving many interconnected variables are difficult, to the point of being impractical, to look at by simply looking at the state of specific variables. For example, the hair color of the last ten people a person met, if such was important to know, might be found by consulting a log of the individuals recently met. From their names, one could find their social security number, from this one could get their driver's license number, and from these records a hair color for each could be retrieved (assuming all this data is in memory). Using an emulator to examine memory and ask "what is the value of variable A?" as a technique to solve the prior problem is so difficult that the goal becomes unobtainable.

Returning to a simpler bug, one that is easily repeatable, a common debugging process is to write a "print" program (or portion of code) that does a lot of work running around through various data structures so one can easily see "the hair colors of the last ten people a person met." The program is then run and re-run, over and over again, each time inserting a call to this "print" program, and other prints statements as appropriate, to progressively isolate and understand the origin of the series of unexpected events that eventually lead to the bug being observed. Unfortunately, this technique cannot always be utilized to address intermittent program bugs.

In view of the forgoing, there is a need for a method that provides improved debugging of intermittent programming bugs. The method should make all bugs essentially repeatable and allow debugging to occur on the repeatable bugs.

SUMMARY OF THE INVENTION

Broadly speaking, the present invention fills these needs by providing systems and methods for debugging using simulated re-execution of a computer program. Broadly speaking, embodiments of the present invention make program bugs essentially repeatable, and allow the user to insert debugging logic, such as print requests. In this manner, simulated execution is used to progressively isolate the bug. In one embodiment, a method for debugging a computer program is disclosed. The method includes recording program information in a trace buffer. The program information generally includes write accesses from the computer program and branches in an execution path of the computer program. In addition, a memory image of at least a portion of memory being utilized by the computer program is captured. This is often referred to as a memory 'snapshot.' Simulating execution of the computer program then occurs by changing a state of the memory image based on the program information and a current state of the memory image. Further, debugging logic, such as one or more print requests, can be inserted at points in the computer program. In particular, the debugging logic does not change the trace buffer or the memory image, and as such, do not affect the sequence of events being debugged. As will be described in greater detail below, the debugging logic is performed upon detection during simulated execution of the computer program.

In an additional embodiment, a system is disclosed for debugging a computer program. The system includes a trace buffer for recording program information. As above, the program information includes write accesses and branches in the execution path of the computer program. A memory is also included for storing a memory image of at least a portion of memory being utilized by the computer program. The system further includes logic that simulates execution of the computer program by changing a state of the memory image based on the program information and a current state of the memory image. In addition, a program counter (PC) register is included that corresponds to program information read from the trace buffer during simulated program execution of the computer program. During simulated execution, debugging logic is detected by determining when the PC register corresponds to a location in source code at which the debugging logic was inserted, the source code corresponding to the computer program.

A computer program embodied on a computer readable medium for debugging an application program is disclosed in a further embodiment of the present invention. The computer program includes a code segment that records program information in a trace buffer. As above, the program information includes write accesses and branches in the execution path of the application program. In addition, a code segment is included that captures a memory image of at least a portion of memory being utilize by the application program. A code segment is also included that simulates execution of the application program by changing a state of the memory image based on the program information and a current state of the memory image. During simulated execution, a code segment is included that performs debugging logic. The debugging logic is inserted by a user at a particular points in the application program. Further, the debugging logic does not change the trace buffer or memory image. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
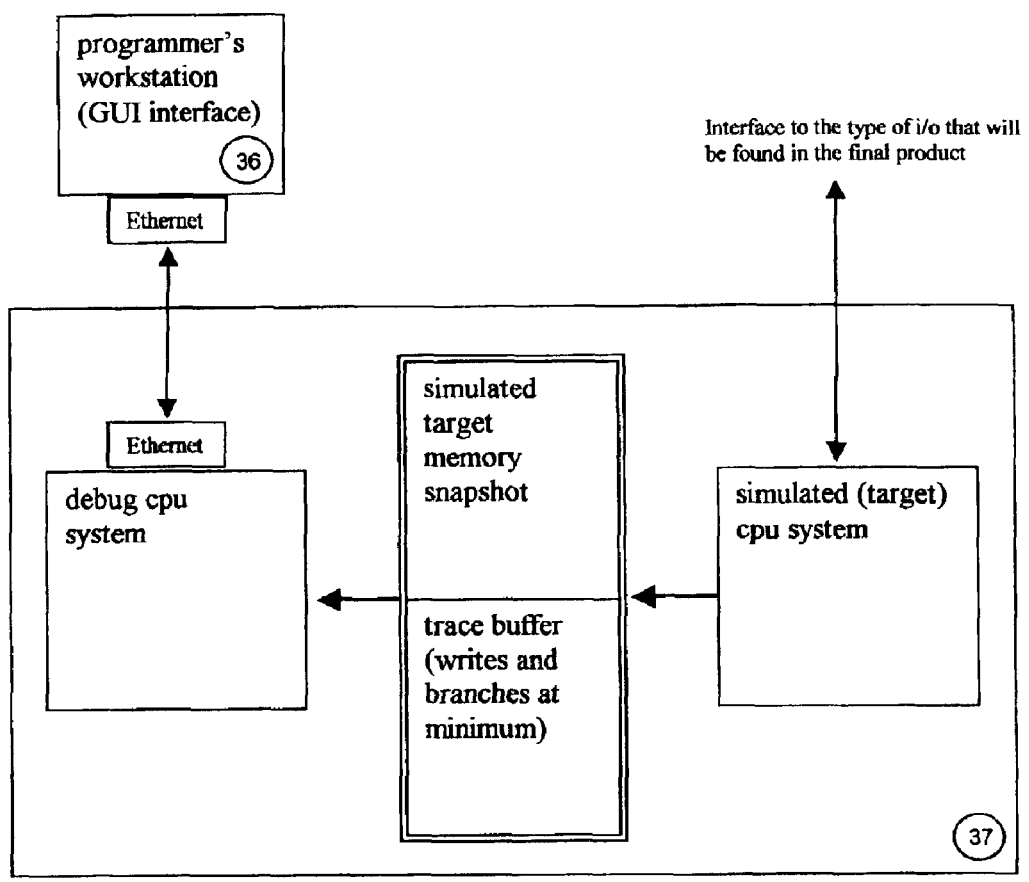
FIG. 1 shows a general overview of a hardware environment supporting the software (program) debugging process in accordance with an embodiment of the present invention.

An invention is disclosed for a method for software debugging via simulated re-execution of a computer program. Generally speaking, embodiments of the present invention make all bugs essentially repeatable and then allow insertion of "print" statements and re-running the failure to progressively isolate the bug. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As mentioned above, embodiments of the present invention address intermittent bugs by making what could be an intermittent bug "repeatable," at least in as many cases as possible. The solution involves using an enormous trace buffer such that a programmer is likely to capture all the events from the origin to the first appearance of a bug. In addition, snapshot of memory (i.e., a memory image) is taken immediately upon completing capturing a trace (i.e., the tracing process concludes, having stored various events in the trace buffer). General trace buffers capture a large amount of data, often every bus cycle. However, the present invention desires to "re-run" in simulated fashion the execution of the processor during the period of time captured in the trace buffer and memory snapshot. A simulated re-run includes producing output from the inserted print statements and re-establishing substantially the state of memory at various points in the captured period of time (which can then be examined by the programmer or used as "input" to inserted print logic). The simulation may or may not affect other "outputs" (e.g., a video output or an LED) depending on the whether the present invention is extended to also affect such during a simulated re-run.

Although general trace buffers can capture a large amount of data, often every read and write bus cycle, the trace buffer required in the present invention only needs to capture data changes (writes) and the program flow (program counter (PC) or equivalent). Given the frozen memory snapshot taken at the time tracing stopped, and the trace buffer that contains a list of every memory location modified and the before and after state, one can apply the changes in either direction to move the state of the snapshot forward or back in time. For example, to "run" the memory snapshot backward in time, one walks backward through the trace buffer writing the before-modification values back to their associated locations (in the snapshot). To run forward in time, one walks forward writing after-modification values back to their associated locations.

Add entries in the trace buffer to capture the program flow, along with the writes, and one can re-create the execution path and the state of memory at each transition point (write) and branch, during the period of time captured by the trace buffer. Add compression techniques to the trace buffer's data and the trace buffer becomes effectively even larger and thus more likely to capture all events surrounding a bug or point of interest.

The next question is "how does one debug using a memory image that can be run forward and back through a period of time, and correlated with the processor's execution path through the program?" We return to the problem previously discussed where providing the programmer with the ability to add print statements into the code allowed the presentation of complex data structures. In order to allow the insertion of print statements, as a means of debugging, as applied to the captured trace and memory snapshot, the present invention utilizes an enhanced interactive development environment (IDE). Such an enhanced IDE has the ability to allow the programmer to capture a trace and memory snapshot, insert special prints into the source code, and then re-run the captured period of time, with the inserted prints providing insight toward solving the bug.

Embodiments of the present invention accomplish this simulated re-run by compiling each inserted print within the source context to which it is inserted, but separating out the resulting code to be special routines that can be "executed" by the debug environment. Thus, a special compiler or compilation process is used where the inserted source does not alter the actual original code produced prior to insertion, but where the "print" code (print-code) associated with the inserted print statements is set aside within the IDE, such that when a print routine is "executed" (by appropriate means) and provided with the current stale of memory, the print routine produces the intended print output.

Thus, a simulated re-run is performed by the present invention by advancing the PC and corresponding memory state forward or back until the PC indicates the program has reached a location in the source where a print has been inserted. The print-code associated with this print is then executed, being provided with the current memory state, and the resulting output presented to the user (or otherwise directed, for example, to a file). After executing the print-code, the simulation continues moving through time until another inserted print location is reached, or until the limit of the trace buffer is reached, or the programmer otherwise stops the process.

Print-code should not alter the state of memory, for two reasons. First, print-code is logic that by definition observes and presents data in memory. If it were allowed to modify the captured memory, and somehow the program was really re-executed, the program's nature could change from that captured. Hence, this is analogous to going back in time and changing events, realizing that by doing such, the future is then altered. Embodiments of the present invention do not allow print-code to alter memory such that the execution path and associated changes to memory could change. However, print-code is allowed to introduce variables and routines, and generate writes to these variables, as long as they are essentially in an independent memory space (i.e., local to the print-code routines).

The second reason print-code should not alter the memory snapshot (that is being run back and forth through time) is that the movement through time is accomplished using captured write access information in the trace buffer and thus the original code is not actually being re-executed and therefore cannot react to a change introduced. Of course, there is no reason why a memory snapshot cannot be used as a starting point or from which to obtain various initial states for executing modified code.

It should be noted that a memory snapshot can be accomplished by halting the processor (execution of the program being debugged) after tracing stops, and then using the memory in the state it is left at this time. Using the trace buffer, this memory can then be run forward and back in time, but ultimately returned to its just-prior-to-stopping state in order to allow continued execution of the program. An additional embodiment involves halting the processor and copying memory to another "snapshot" memory, then resuming processing.

A typical embodiment therefore can involve the following operations:

1) A trace (log) of all writes to memory and the execution path through the program is stored for some window of time.
2) When tracing stops, due to any means, such but not limited to a trigger event or programmer intervention, a snapshot of memory is established.
3) An IDE allows the programmer to insert special print statements into the program that are compiled into essentially separate and independent routines from the original code.
4) The IDE simulates the re-execution of the captured interval of time by combining information in the trace buffer with the memory snapshot, and executing print-code routines as the snapshot advances from one state to another through time, where the PC (program counter) corresponding to any given state correlates to a newly inserted print statement.

These operations provide a method of debugging software that involves capturing events in a window of time and then allowing for repeated simulation of these events. During a repeated simulation the user can effectively insert print statements into the code, whose presence and effect are combined with the captured information to form a new "simulated" re-run that includes the inserted prints. By allowing a programmer to re-run and add print statements to a captured period of time, the programmer more easily can debug the program. There is no need to actually re-run and re-create a given situation (bug) of interest. Building upon a trace of a program's execution path and memory accesses through a program, and adding a memory snapshot taken on trace termination, this "program information" forms the basis of simulated re-runs of events backward and forward through time. At the same time, debugging is enhanced by checking for and executing any inserted print statements at appropriate times. Such inserted print statements can be added and removed after the capturing of the program information, thus yielding an "after the fact" ability to add prints. A simulated re-run generally yields output from inserted print statements, where such inserted print statements access a substantially re-established state of memory from the appropriate captured moment in time.

In a further embodiment, an IDE is used to insert print statements in the source code. The user selects a position in the source (e.g., a line) and enters "print" instructions or options to the IDE through another window. In other words, the IDE can represent the inserted prints as actual modifications to the source. The IDE may wish to provide a quick way to remove all inserted prints when use of the current captured trace and snapshot concludes. The concept of "adding prints" also includes having a "watch window," which is a list of variables and current values that is updated as the programmer moves through the trace.

Data Introduced from External Sources into the System

By capturing write accesses to a computer's memory, along with a memory snapshot, embodiments of the present invention re-create the computer's state as seen by the program, during simulation. However, in addition to obtaining data from memory, computers have other means of obtaining data. External devices can pass information to a computer through, for example, DMA access, memory mapped i/o, shared RAM (i.e., memory that can be altered by another processor), a special i/o address space, and other means. Care should be taken to capture (in the trace buffer) data written to the processor's memory by sources other than the processor or alert the programmer that the affected portions of memory do not contain usable (valid) data.

For example, in a memory mapped i/o port the value received from a serial UART (RS232) could appear, and be read by the processor. Since the value was never written to memory by the processor, it would not be captured as part of a write cycle in the trace buffer. However, one technique to accomplish such without additional hardware support is to store any value read through an I/O port in a shadow RAM. Thus, during simulation, the programmer could look to the shadow RAM copy to inspect any value read from the UART. Therefore, the present invention anticipates the use of various techniques to capture or alert the programmer to the lack of certain state information that exists outside the context of what is written by the processor to its memory.

Not All State Changes Require Capture

Having stressed the importance of capturing write accesses to the processor's memory, it should also be noted that embodiments of the present invention do not require all such accesses to be captured in order to be useful overall. Consider two cases. First, if a portion of the processor's memory is dual ported in that another processor can write data that just appears in memory to the first, this area can be flagged as unavailable during simulation to any insert print routines. On the other hand, additional embodiments can reveal the contents of the dual ported memory during a simulated re-run.

The second case involves the presence of a second program other than that being debugged, whose execution path is not relevant or not available to present. Consider, for example, an operating system (OS) that provides a run environment and services for the program being debugged. A programmer typically does not follow the execution path from the program being debugged into the OS, because the source may not be available to the IDE and/or the OS is beyond the bounds of debugging for which the programmer is willing to pursue. Therefore, any memory (change) that is only visible to the OS and not the program being debugged does not need to be captured in the trace buffer or memory snapshot, even though such changes involve write accesses to the processor's memory.

In other words, the concept of the processor's memory as it relates to the present invention generally assumes only the memory that is visible to the program being debugged. However, if the OS makes changes in memory that are visible to the program being debugged, such changes should be captured in the trace buffer in order to represent the changes in any re-creation of a memory state done during simulation. On the other hand, by excluding from the trace buffer all writes by the OS to memory not visible to the program being debugged (i.e., memory that is "internal" to the OS), one avoids filling the trace buffer with useless entries since the entries don't relate or at least cannot be seen by the program being debugged.

If one is to separate the OS internal memory write accesses from the program being debugged generated writes to its own memory, and from write accesses by the OS to this program's memory, the question is how? A processor writing to memory in general does not "tag" the write as to its nature (i.e., the originating program and the owner of destination memory), and so capturing a bus write cycle generally does not allow for the desired separation of certain writes from others.

To address this issue, embodiments of the present invention provide a "modified" compiler that produces code for the program being debugged and the operating system that provides for the desired "tagging" of write accesses. In one embodiment, the compiler generates additional writes to capture desired write cycles. The compiler generates code that specifically directs writes that are to be captured to a special trace buffer interface, in addition to memory. Thus, if the compiler is coding a write that is to be captured, it is coded as two writes: one to the trace buffer and the other to memory. If a write is not to be captured, it is coded normally as a write to memory.

Two Opposite Approaches that Yield the Same Result

The present invention in its simplest form, as shown in FIG. 1, involves a Simulated CPU generating a trace of various state changes (e.g., memory writes). Upon ceasing tracing (freezing the trace buffer), a snapshot of a set of states is taken, such that this information can be passed to a Debug CPU. The Debug CPU can apply the trace to the snapshot so as to be able to advance the snapshot's image forward or backward in time corresponding to a position in the trace buffer. While doing so, the Debug CPU can correlate the trace position to a program location (as executed by the Simulated CPU) and detect a "print" or any other logic that has been post-freeze inserted (established) by the programmer. The Debug CPU can execute this logic upon the current snapshot image. Synchronized movement through the trace buffer and adjusting of the snapshot can be done repeatedly while the programmer adds and removes "print" or any other logic from association with specific locations in the original source. This approach of allowing a programmer to insert "print" or any other logic into a captured window of time is referred to as the capture-trace-up-to-snapshot approach.

In a further embodiment, instead of capturing writes and generating a (memory) snapshot at the end of a trace, one could capture (or know) an initial state of the system (a snapshot at some point in time, or the start-up state) and from this point in time capture subsequent non-memory reads and the exact timing of future interrupts. Non-memory reads are any reads that are to memory (or other input sources available to the Simulated CPU that have not been written or otherwise determined) by the Simulated CPU (e.g., an input port that is reading external data). A Debug CPU provided with an initial state of a system, the code image (program) executed, the data "imported" into the system (non-memory reads), and the timing of interrupts, could generate simulated re-run with prints or other logic inserted as previously described.

In this snapshot-and-trace-after method, simply halting the Simulated CPU and reading the desired states could take the required initial state snapshot. It is possible that the amount of data that must be recorded in the trace buffer would actually be less than in the capture-trace-up-to-snapshot approach (since the trace buffer need only capture data introduced into the system from outside, versus that computed or otherwise determined internally). However, both approaches yield the same results but the capture-trace-up-to-snapshot approach is easier to implement, is easier to run backwards from when tracing stops, and does not rely on any particular instruction set in generating a re-run.

At first it would seem the forward and backwards movement through the trace buffer and associated updates to the snapshot of the capture-trace-up-to-snapshot approach do not occur in the snapshot-and-trace-after method. In the later method, a Debug CPU would generally start at the snapshot and run only forward—the Debug CPU needs to "execute"

(using the saved non-memory read data and interrupt history) the instructions, for without keeping an "undo" log/trace, backward execution of instructions is not generally feasible. However, in order for the programmer to perform more than one re-run, the snapshot of the initial state would need to be restored and the trace buffer re-wound, which is effectively a "jump" backward in time. Thus, both approaches, in the context of multiple re-runs, do move back and forth through time.

There are many analogies between the two approaches just discussed, and though greater detail is provided for the capture-trace-up-to-snapshot approach. One skilled in the art of programming will be able to adapt the details so that they would apply to the snapshot-and-trace-after approach after a careful reading of the present disclosure.

The Implementation of the Trace Buffer and Snapshot

As mentioned above, embodiments of the present invention utilize a trace buffer. Trace buffers essentially provide a log of events during a window of time. Tracing then halts and the contents of the trace buffer are frozen typically when either some sequence of pre-programmed triggering events has occurred or the programmer simply requests the tracing to terminate. States of interest are recorded in the trace buffer, which can be, but are not limited to, routines that are executed, values computed, and times at which events occur. The amount of storage available to the trace buffer dictates the maximum length (window) of time that can be recorded. Typically, in order to make room for new entries being added, a trace buffer discards its oldest entries in favor of newer entries when the buffer becomes full (circular buffer). A challenge in designing tracing systems that deal with high-speed events (e.g., bus cycles) is to accept and store the data as fast as the processor is generating it.

Tracing halts, therefore freezing the contents of the trace buffer, typically in response to some sequence of pre-programmed triggering events or the programmer simply requesting tracing to terminate.

Tracing systems can be built in numerous ways. There can be on-chip provisions to record and store data. If the data is exposed (outside of the chip containing the processor) such as signals on a bus, the bus can be monitored and some or all of the traffic stored in a trace buffer. The data captured while tracing can be stored in a RAM memory and/or on a hard disk drive, with this RAM or hard disk, or other such storage means, playing the role of the trace buffer.

Embodiments of the present invention employ a trace buffer, which can for purposes of discussion be described as a memory. Any storage device is acceptable for storing data providing the storage device can service the needs of the present invention (e.g., record incoming data).

The data recorded by the trace buffer describes a processor's execution path through a program (code) and certain memory write accesses, including the before and after state of a memory write. However, the present invention anticipates including additional information, for example but not limited to, timestamps, that further enhance the usefulness of the captured trace as a whole. Further, the present invention anticipates storing alternative information in the trace buffer from which, along with a snapshot, the state of a system can be re-constructed and simulated through a period of time, as highlighted in the prior comparison between the capture-trace-up-to-snapshot and snapshot-and-trace-after approaches. Also, as another example, one need not store both the before and after values associated with a write, but only the before value, realizing the after value can be obtained from the snapshot (a tradeoff between space and complexity).

There are many methods of generating a snapshot, the simplest being to stop the system and read out its current state. The present invention anticipates the use of various methods of generating a snapshot, and recommends one (described later) that is particularly well suited for use in situations where a snapshot must be made without halting the processes of the system (Simulated CPU).

The following description of the preferred embodiment of the present invention can be implemented either substantially in software on an off-the-shelf personal computer (PC) and/or using dedicated and specialized hardware (an emulator) to perform the required operations at higher speeds. Although the use of multiple computers is described, it is possible to use fewer or just one processor by combining tasks.

The arrows in the figures generally indicate a major flow of data or control. However, many required interconnections are not shown as they can be worked out by one skilled in the art of computer design in the normal course of implementing the present invention, and whose inclusion would cloud important features in a given figure. Any sizes, such as the size of a memory or the width of a pointer or register, are provided simply for the sake of example, and do not imply a requirement and/or size limitation. In addition, the terms "CPU" and "processor" are interchangeable throughout this document.

It is assumed a goal of the programmer is to write and debug his or her program such that it runs on a final product that contains a Target CPU. Though other variations are possible, the present invention is described in terms of replacing the Target CPU with an interface to the I/O that it would otherwise control, and using an external emulator that connects to this interface, which contains a Simulated (Target) CPU to play the role of the original Target CPU. Once the programmer has completed debugging the program, typically the program is downloaded through a flash or other non-volatile memory interface so that the emulator can be removed and the Target CPU re-inserted and used with this program in the final product.

FIGS. 1–4 together illustrate in varying degrees of detail a general overview of a hardware environment supporting the present invention. FIGS. 5 through 8 present in detail the various sections of the overall system as presented in FIGS. 1 through 4. Items not discussed in connection with FIGS. 1–4 are covered in the description of FIGS. 5 through 8.

FIG. 1 shows a general overview of a hardware environment supporting the software (program) debugging process envisioned by the present invention. It involves three (logical) computers. A PC workstation 36, which generally interacts with the user via a graphical user interface, is responsible for compiling source into executable code and directing the emulator. The emulator 37 contains two processors. Debugging is performed using the additional resources of the emulator, such as a trace buffer and snapshot system that are (generally) not present in the final product. The final product consists of a Target Processor and associated memory and peripherals (I/O), as required by a particular product design. The emulator contains a Simulated (Target) Processor that performs the operations that are normally done by the Target Processor in the final product. The Debug Processor in the emulator acts to oversee the emulator's functions, performs off-line simulated runs, and communicates to the programmer's workstation (for example, through an Ethernet interface).

Figure 2:
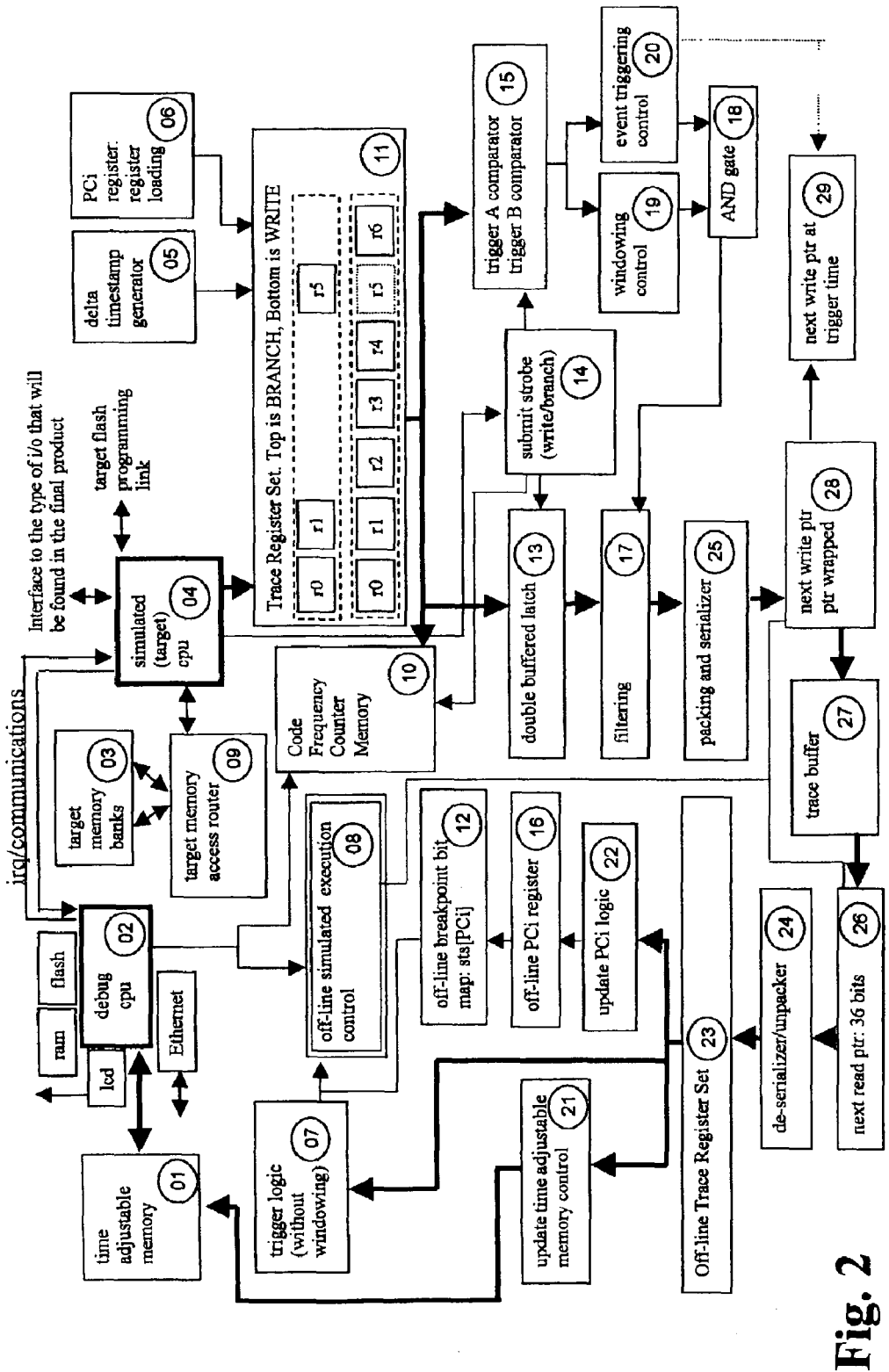
FIG. 2 shows the overall system in greater detail, in accordance with an embodiment of the present invention.

FIG. 2 shows the overall system in great detail. As in FIG. 1, one can see the major flow of data from the Simulated CPU 4, involving the trace buffer 27 and snapshot (held in bank 1 of the Target Memory Banks 3), to the Debug CPU 2, and eventually through the Ethernet interface to the PC workstation.

Figure 3:
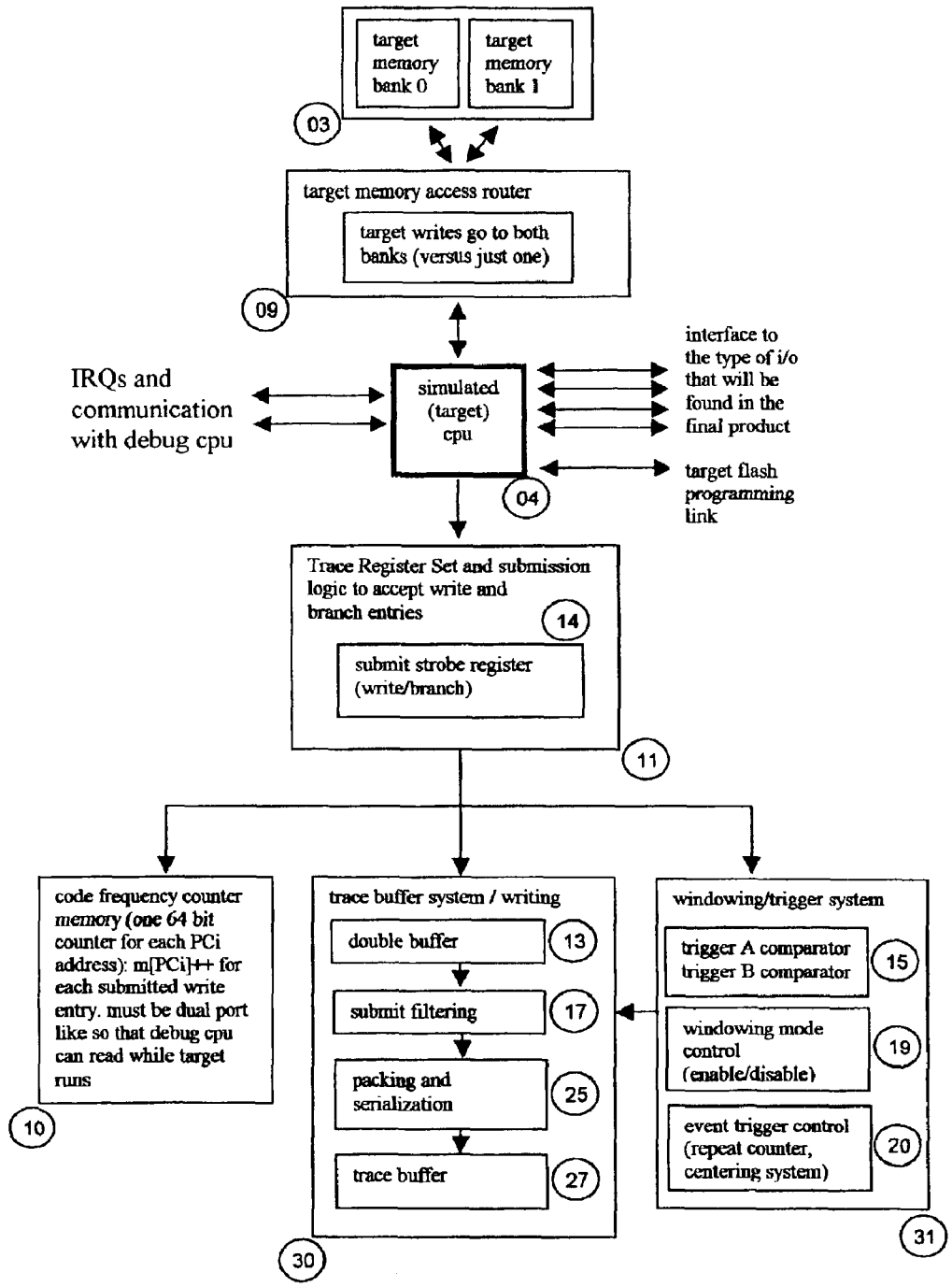
FIG. 3 is an illustrate that shows an on-line process where the Simulated CPU is setting up and submitting trace entries, in accordance with an embodiment of the present invention.
Figure 4:
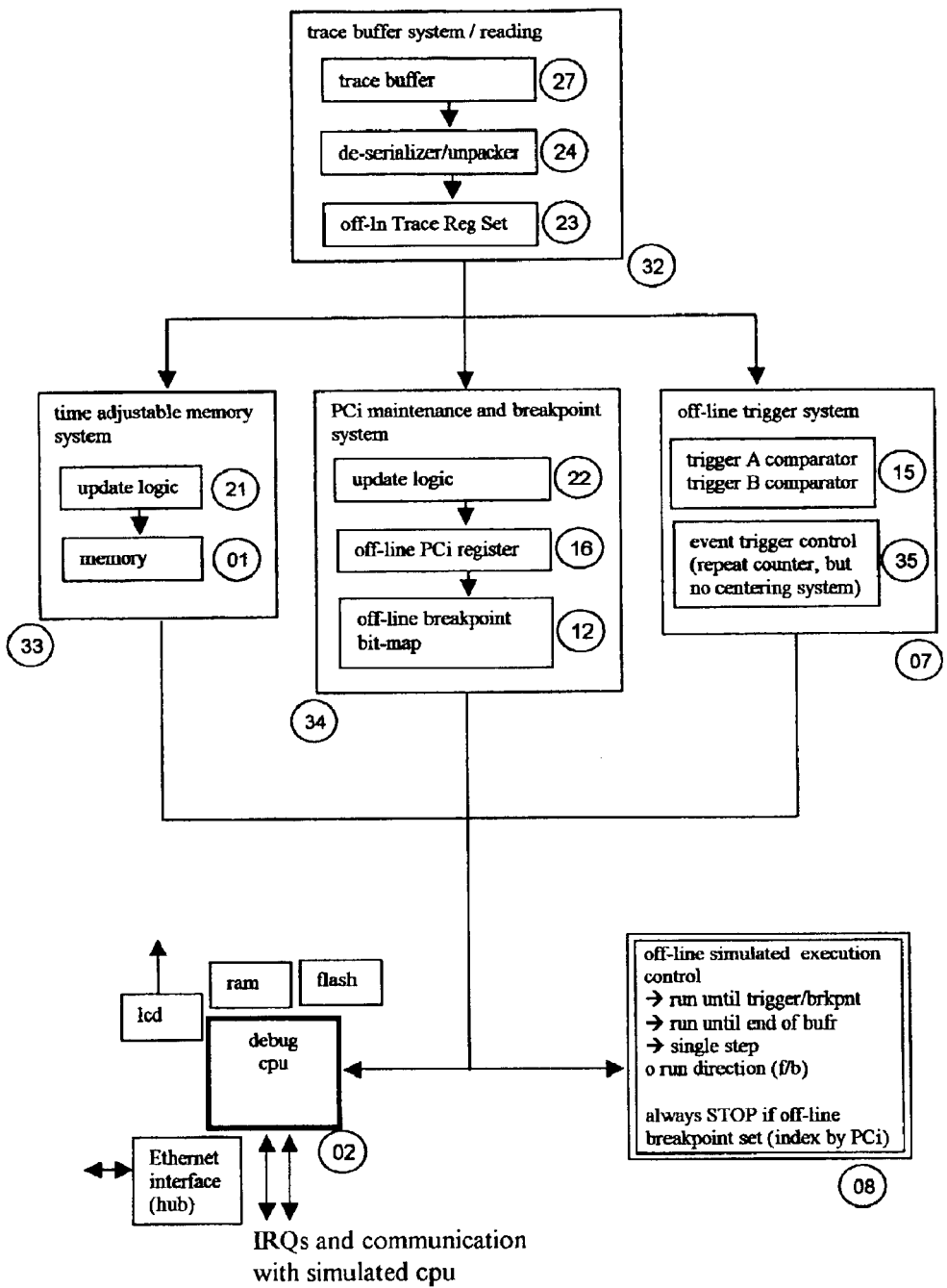
FIG. 4 is an illustrate that shows the process of moving trace entries out of the read side of the Trace Buffer System and how the data drives the off-line processes of maintaining a synchronized Time Adjustable Memory, the processing of the current PCi 34, and an Off-line Trigger System, in accordance with an embodiment of the present invention.

FIGS. 3 and 4 together show the overall system at a mid-level of detail between FIG. 1 and 2. FIG. 3 particularly highlights the on-line process where the Simulated CPU is setting up and submitting trace entries, which drive a Code Frequency Counter System 10, a write side of the Trace Buffer System 30, and a Windowing/Trigger System 31. FIG. 4 particularly highlights the process of moving trace entries out of the read side of the Trace Buffer System 32 and how the data drives the off-line processes of maintaining a synchronized Time Adjustable Memory 33, the processing of the current PCi 34, and an Off-line Trigger System 7. The processing of the current PCi involves maintaining a current PCi location (an index or value that can be correlated back to a statement or location in the source) and whether such indicates a breakpoint, where steps are to be inserted by the Debug CPU.

The workstation talks to a Debug CPU 2, which is responsible for setting up and communicating with the Simulated CPU 4. The Simulated CPU stores its data in the Target Memory System 3, which includes two banks. The use of two banks provides for obtaining a snapshot, as will be discussed shortly. The Simulated CPU will generally have I/O such as, for example, optical links and serial ports through which the program being debugged communicates with its world (i.e., the I/O associated with the final Target CPU).

At some point in time the Debug CPU needs to freeze a snapshot of the Simulated CPU's memory. As previously discussed, it could halt the Simulated CPU. However, when debugging real-time embedded systems it is often undesirable to significantly interrupt the Simulated CPU. Thus, one embodiment attaches a double size memory 3 to the Simulated CPU (that holds both banks 0 and 1 in FIG. 3). All captured writes are implemented by writing both to the memory representing bank 0 and through a base register to bank 1. Bank 0 includes the "live" image to which read and writes normally occur. Bank 1 includes an image that can be frozen by request. When beginning to operate in a mode where a freeze request is possible (begin tracing), the Simulated CPU copies all the data from bank 0 to bank 1 (which may be performed over a "long" period of time in order to avoid excessively interrupting the Simulated Processor from its other duties).

Prior to the copy process, the Simulated CPU sets the bank 1 base register to the start address of bank 1 which plays the role of the Simulated Memory Access Router 9, of FIG. 3. Since all captured writes are written to both bank 0 and 1, the data in bank 1 can be frozen and used as the source for a memory snapshot (with the processor continuing on using bank 0). Of course, in order to accomplish the "freeze" the Simulated CPU must cease writing to bank 1. This is done by changing the bank 1 base register to instead indicate bank 0. Thus, when the processor generates its two writes, as specially coded by the compiler for captured write accesses, both writes will actually go to bank 0 thus preserving the snapshot in bank 1 (equivalent to "grounding" writes through the base register—they perform no function). The Simulated CPU can then read and pass back the snapshot in bank 1 to the Debug CPU. Note that if the code executed or data manipulated by the Simulated CPU is not visible (as data) to the program being debugged, it may not be duplicated or represented in the two banks, but in another memory outside of that used for the two banks.

One method of generating a trace is to have the compiler generate special code for writes that are to be captured, where the code executes on the Simulated Processor in the emulator, which has support for capturing a trace. Eventually, the program is re-compiled without the special code and it is this code that is actually run on the final Target Processor. To see the difference in coding, consider the assignment:

X=Y

This typically is compiled into (machine level) code that performs:

| | | |
|---|---|---|
| load | Y -> x0 | ~ load Y into register |
| store | x0 -> X | ~ store register into X |

Note that x0 represents a temporary register inside the processor. The prior code is that which eventually runs on the final target. However, during debugging, the compiler generates the following "special" code for use in the emulator. The emulator has (in hardware) a Trace Register Set 11, in FIG. 5, which is a set of trace registers that are loaded directly by the Simulated CPU and by other means, to capture either a branch or write access. Thus the following code has added instructions to set up and submit the trace registers in order to capture the write performed in the assignment X=Y.

| | | |
|---|---|---|
| load | Y -> x0 | |
| load | address of X -> x1 | ~ address for write |
| move | id of 'X' -> trace_register(r0) | ~ record destination varb 'name' |
| move | x1 -> trace_register(r2) | ~ record physical address |
| move | (x1) -> trace_register(r3) | ~ record original value * |
| move | x0 -> trace_register(r4) | ~ record new value |
| move | 'write' -> trace_stobe | ~ submit the trace register set * |
| move | x0 -> (x1) | ~ perform the write * |
| move | x0 -> bank1_base_register(x1) | ~ keep bank1 updated, if enabled * |

The starred (*) instructions in the prior example could be eliminated if the emulator's hardware was sufficiently powerful to perform these steps once the physical address and new value were loaded (the submit operation is implicit in loading the new value register).

Care should be taken when terminating a trace and when handling interrupts to insure a synchronized state between the trace system and the snapshot. One solution is to disable interrupts around all the code implementing a write and submitting it to the trace system. This assumes a trace is terminated and the snapshot frozen by means of sending an interrupt to the Simulated CPU (which can insure proper synchronization).

The Timestamp Register 5 (r5) and the PCi Register 6 (r6) are automatically loaded by the hardware. Timestamp information is used to correlate events with the actual time at which they occurred.

Two types of entries are submitted through the on-line Trace Register Set: a branch entry, which records the current and subsequent non-continuous PCi address or a write entry, which records the modification (write) of memory.

Once the write or branch is submitted to the submit strobe register 14, the trace registers drive three somewhat independent processes. First, the PCi Register, which contains a form of line (statement) number that can be correlated back to the actual source, is used as an address (index) in the Code Frequency Counter (CFC) memory 10. For each write or branch the appropriate CFC counter incremented. Thus, for every PCi value, the programmer can determine if the corresponding source has ever been executed and if so, the number of times. Therefore, the programmer is able to generate a code coverage map (what code has and has not been executed, which is useful to know when testing) and do performance analysis (what parts of the program are being executed frequently, and thus taking a relatively large amount of time to execute).

Figure 7:
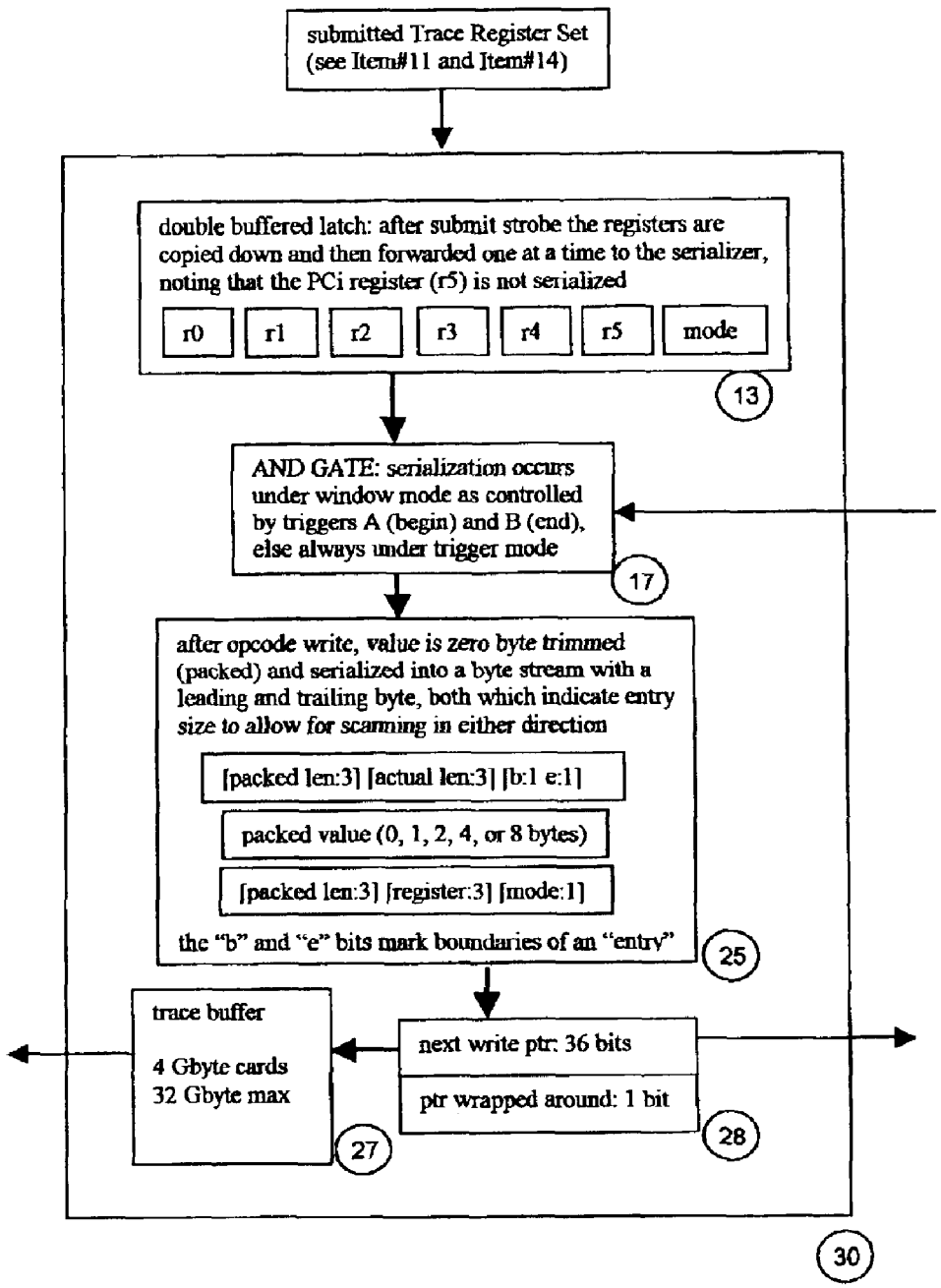
FIG. 7 is a bock diagram showing logic and write side of a trace buffer system.

The second process driven by the trace registers is to record the write or branch access in the trace buffer. The registers (that have been setup) move through a buffer 13 in FIG. 7, and if the Trace Register Set is to be logged (AND GATE 17 of FIG. 7), they are serialized into a byte stream and packed by, for example, dropping the leading zero bytes in values (FIG. 7 element 25). The packed and serialized form of a Trace Register Set involves representing the data as a byte stream, where the stream contains a series of packed register entries. Each entry indicates its original length (without dropping leading zero bytes) and the packed length (only the non-zero LSBs). The actual length is present at both the start and end of the packed byte stream, thus allowing a pointer to advance forward and backward over the entry as eventually stored in the trace buffer. Two bit flags, "b" and "e", mark the beginning and end of a set of packed register entries that as a whole make up a single Trace Register Set. There are other methods for packing representing various tradeoffs, for example between complexity and efficiency. For example, a more complex solution would involve wrapping the entire Trace Register Set with total length bytes at each end, and then including only one packed register length field for each register for which packing is likely useful. This solution, however, would generally achieve better packing.

Figure 5:
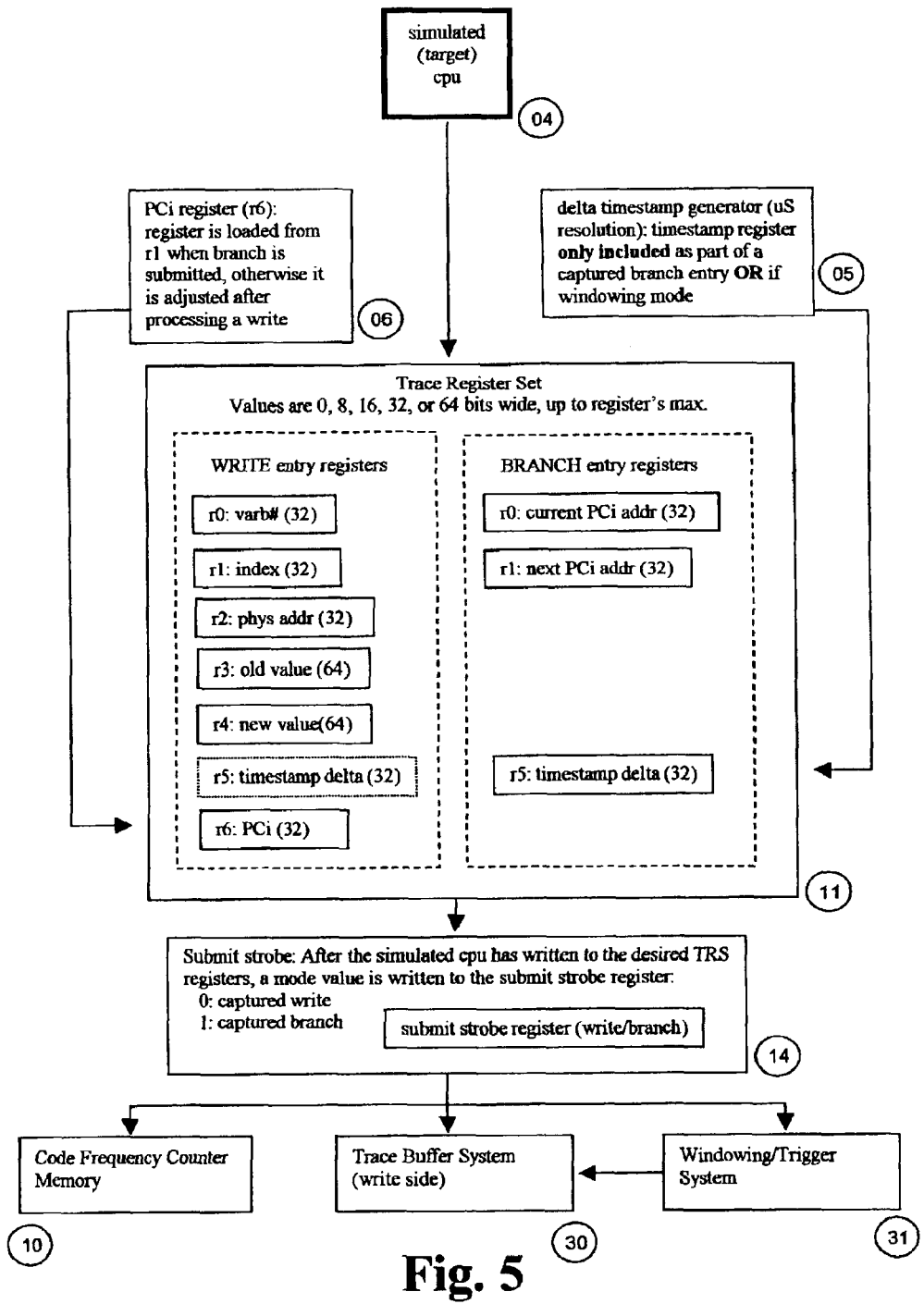
FIG. 5 is a block diagram showing a trace register set simulated CPU flow, in accordance with an embodiment of the present invention.

In FIG. 5, the "r0: varb#" field in 11 can be a link or index that indicates the variable whose value is being altered. If all variables where allocated in static memory, the physical address being written ("r2: phys addr" in 11) can serve adequately. However, programs often allocate variables dynamically (e.g., on the stack). Moreover, the storage associated with a variable can be subject to garbage collection, and thus moved. Therefore, the Trace Register Set provides for identifying a variable by a form of unique tag (varb#) instead of through its address. Further, in order to handle array indexing in some cases, the index value, if any, used in the write access is also provided in the Trace Register Set. By providing a means to identify the variable and possible index value associated with a write access, triggering options are expanded. It is acknowledged that these two pieces are information do not describe all possible write accesses available in many computer languages (e.g., field selection, multiple levels of indirection, etc.). However, it should be noted that embodiments of the present invention can utilize additional information to describe other write accesses available in computer languages.

The serialized (race data is written into a large circular trace buffer 27. A next write pointer and flag indicating whether the pointer has wrapped around 28 control the data going into the buffer. Once a complete trace corresponding to some window in time has been captured, writing to the trace buffer initiated from the Simulated CPU ceases and reading from the trace buffer initiated from the Debug CPU begins.

Figure 8:
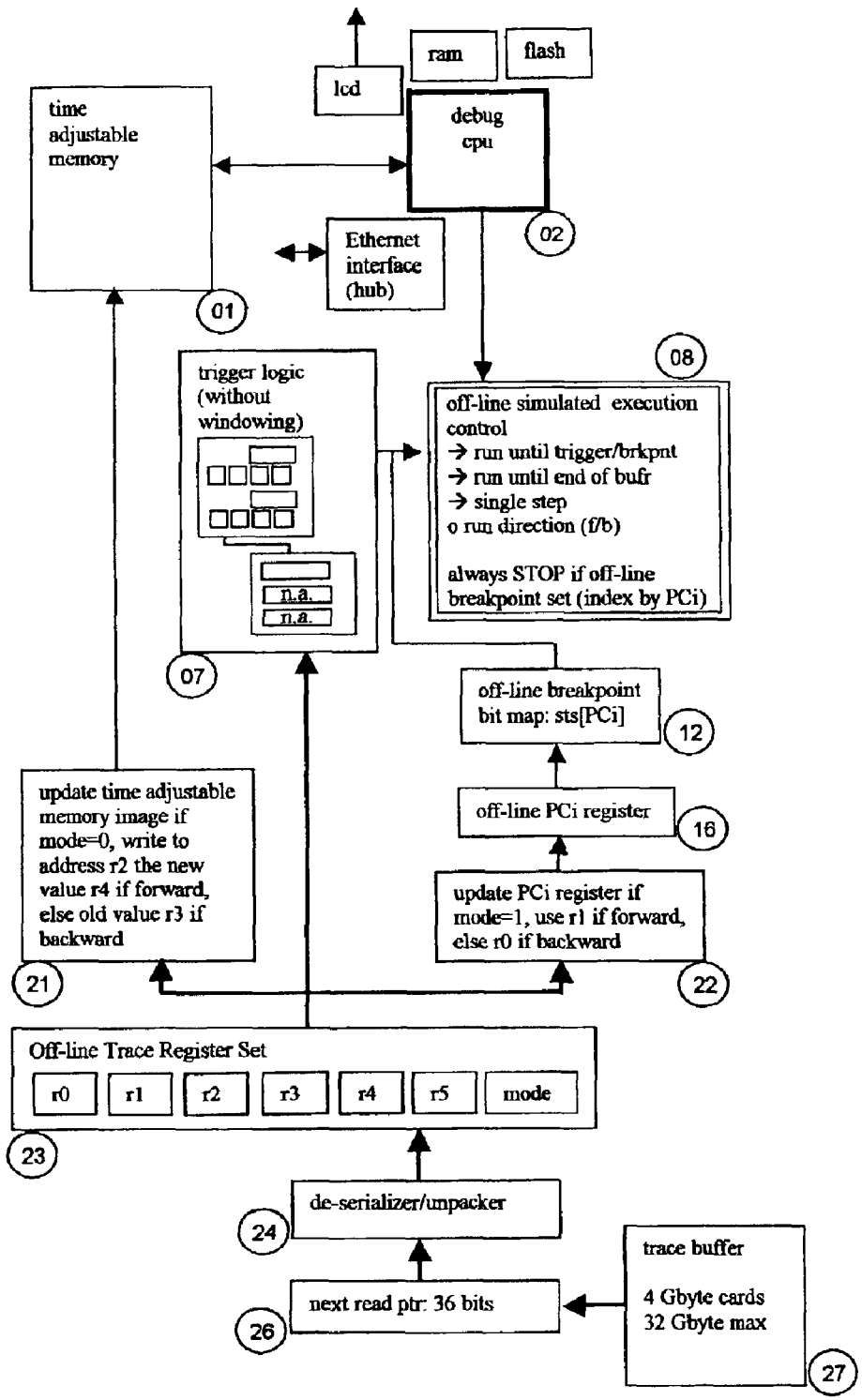
FIG. 8 is a bock diagram showing logic on the read side of the trace buffer system.

The next read pointer 26, in FIG. 8, guides the data out of the buffer, either advancing forward or backward within the written area. The de-serializer/unpacker 24 converts the byte stream back into a re-created Trace Register Set 23.

Figure 6:
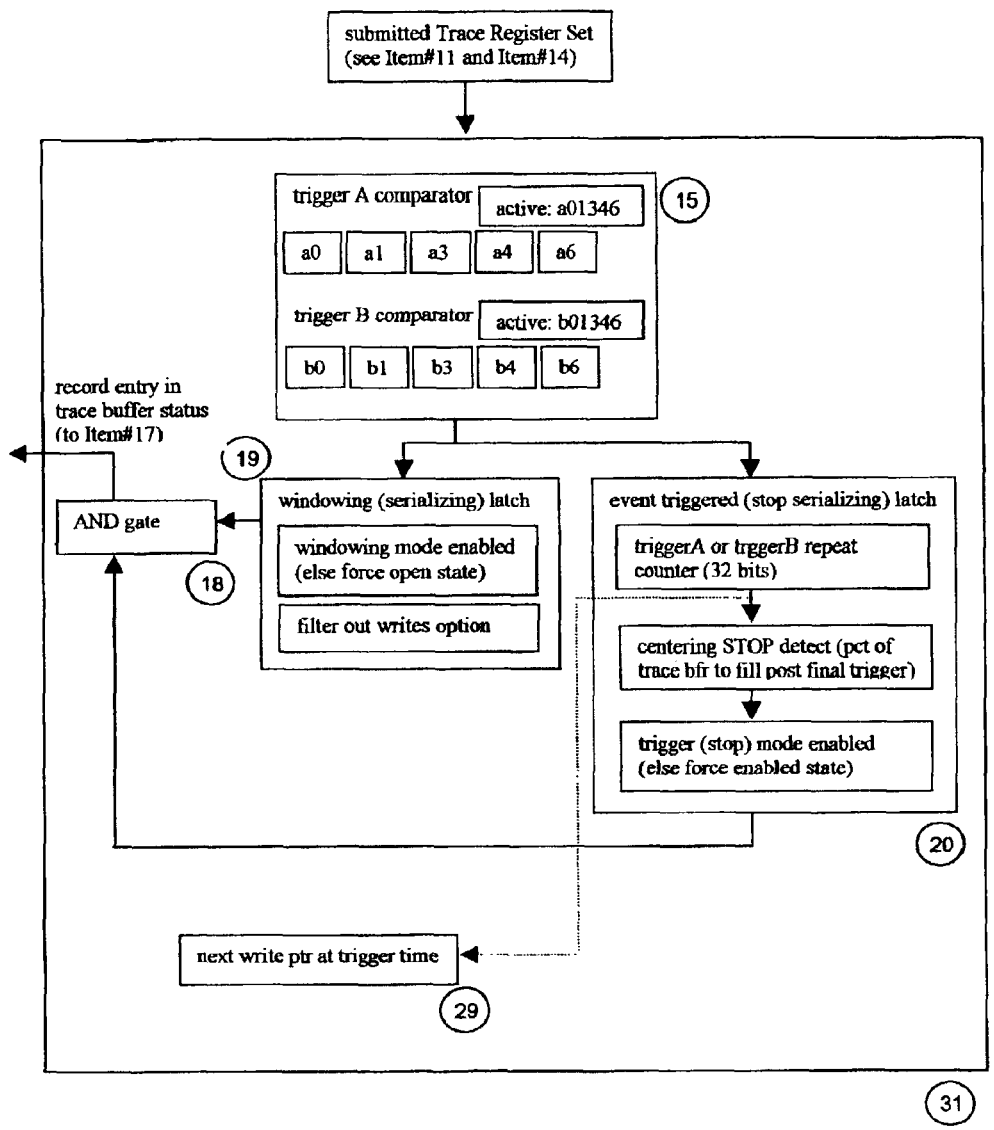
FIG. 6 is a block diagram showing a windowing and trigger system, in accordance with an embodiment of the present invention.

As illustrated in FIG. 6, the third process driven by the submission of a Trace Register Set is the trace termination. (trigger) logic. The programmer configures the logic to halt tracing based on various conditions. In one embodiment, two triggers 15 are used, where each includes registers corresponding to the trace variable# (r0), index value (r1, if indexing present), old value (r3), new value (r4), and PCi (r6) registers 11. On each submission, the appropriate and active registers are compared for each trigger and an output trigger A and B status is determined. The tracing system can be configured to operate in either a windowed mode 19 where only certain trace entries are placed in the trace buffer 27. Alternatively, event triggering mode 20 involves storing all entries, but the trace is stopped after either trigger A or B occurs a specified number of times (called "trigger time" as is controlled by the repeat counter) and after the trace buffer post-trigger time fills to a specified level (centering system). Note that the value of the next write pointer (into the trace buffer) at trigger time is saved, as illustrated by the next write pointer 29 of FIG. 6, as the programmer typically accesses the trace buffer relative to this position.

The determination of whether to record the current Trace Register Set in the trace buffer is made by combining results from the windowing and event trigger logic, as shown by the AND gate 18 of FIG. 6. The Debug CPU is assumed to have access to the various systems and states, such as whether the trigger time has occurred.

When either the programmer manually halts tracing or a trigger time has occurred and the centering process has taken the appropriate post-trigger number of samples (so tracing stops), the trace buffer is then available for simulated off-line runs. Note that by providing for two CPUs in the emulator, the Simulated CPU is able to continue running the program being debugged (on-line) while the Debug CPU is able to run off-line simulations using the data in the trace buffer.

The Debug CPU is able to (cause to be) read data from the trace buffer 27, in either direction (forward or backward in time), where Trace Register Sets are de-serialized and unpacked by the de-serializer/unpacker 24 of FIG. 8. The next read pointer 26 moves within bounds defined by the last state of the next write pointer 28 and the knowledge of whether the pointer wrapped.

Each off-line Trace Register Set drives various functions. The registers are used to update the time adjustable memory 1 to re-create the target memory 3 at the time corresponding to when the Trace Register Set was processed. This is done by either writing into the memory the original (old) value, if moving backwards in time, or the new value, if moving forwards in time, as shown in operation 21 of FIG. 8. Initially, when tracing stops, the Simulated CPU freezes the image in bank 1 9 and this image is copied to and becomes the current state in the time adjustable memory corresponding to the processing of the last entry written into the trace buffer. Thus, the last entry written into the trace buffer is the first retrieved by the next read pointer. As Trace Register Sets are re-created, the PCi register is also maintained, as shown in operation 22 of FIG. 8. If one is moving forwards through time and encounters a branch entry, the PCi register is updated based on the next address/PCi value (r1). If one is moving backwards through time, processing a branch entry causes a PCi update based on the current address/PCi value (r0). Processing of a write entry causes the PCi register to either increment or decrement depending on the direction of movement through time (forward=increment, backward=decrement).

The off-line PCi register 16 is run through a hit map that indicates if the programmer has placed a breakpoint at the corresponding source line or statement, and/or if the programmer has inserted print statements for which the associated code should be executed before again advancing in the trace buffer 12. A simulated run is terminated by either a trigger condition in the trigger logic 7 similar in nature to that available when originally capturing the trace, a breakpoint, or by reaching the limits of the trace buffer. The control logic 8 and the Debug CPU 2 handle the details of a simulated run. It should be borne in mind that other methods for generating trigger conditions can be utilized in addition to those illustrated in FIG. 6, which use two sets of comparators 15, and providing for Windowing Mode 19 and an Event Trigger Mode 20.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for debugging a computer program, comprising the operations of:

recording program information in a trace buffer, the program information including write accesses from the computer program and branches in an execution path of the computer program;

capturing a memory image of at least a portion of memory utilized by the computer program;

simulating execution of the computer program by changing a state of the memory image based on the program information and a current state of the memory image; and inserting debugging logic at a particular point in the computer program, wherein the debugging logic does not change the trace buffer and does not change the memory image, the debugging logic being performed upon detection during simulated execution of the computer program.

2. A method as recited in claim 1, further comprising the operation of halting the recording of program information and the capturing of the memory image at a same time.

3. A method as recited in claim 2, further comprising the operation of maintaining a program counter (PC) register corresponding to program information read from the trace buffer during simulated program execution.

4. A method as recited in claim 3, wherein the debugging logic is detected by determining during simulated execution when the PC register corresponds to a location in source code at which the debugging logic was inserted, the source code corresponding to the computer program.

5. A method as recited in claim 1, wherein the debugging logic is compiled to a location separate from the memory image and the trace buffer, the debugging logic being executed from the location.

6. A method as recited in claim 1, wherein the debugging logic is interpreted using a program interpreter upon detection during simulated execution.

7. A method as recited in claim 1, further comprising the operation of writing before-modification values of program information from the trace buffer to associated locations in the memory image.

8. A method as recited in claim 7, further comprising the operation of writing after-modification values of program information from the trace buffer to associated locations in the memory image.

9. A system for debugging a computer program, comprising:

a trace buffer for recording program information, the program information including write accesses from the computer program and branches in an execution path of the computer program;

memory for storing a memory image of at least a portion of memory utilized by the computer program;

logic that simulates execution of the computer program by changing a state of the memory image based on the program information and a current state of the memory image; and a program counter (PC) register corresponding to program information read from the trace buffer during simulated program execution, wherein debugging logic is detected by determining during simulated execution when the PC register corresponds to a location in source code at which the debugging logic was inserted, the source code corresponding to the computer program.

10. A system as recited in claim 9, wherein the debugging logic does not change the trace buffer and does not change the memory image, the debugging logic being performed upon detection during simulated execution of the computer program.

11. A system as recited in claim 9, further comprising logic that halts the recording of program information and the capturing of the memory image at a same time.

12. A system as recited in claim 9, wherein the debugging logic is compiled to a location separate from the memory image and the trace buffer, the debugging logic being executed from the location.

13. A system as recited in claim 9, wherein the debugging logic is interpreted using a program interpreter upon detection during simulated execution.

14. A computer program embodied on a computer readable medium, the computer program capable of debugging an application program, comprising:

a code segment that records program information in a trace buffer, the program information including write accesses from an application program and branches in an execution path of the application program;

a code segment that captures a memory image of at least a portion of memory utilized by the application program;

a code segment that simulates execution of the application program by changing a state of the memory image based on the program information and a current state of the memory image; and a code segment that performs debugging logic during simulated execution of the application program, the debugging logic being inserted by a user at a particular point in the application program, wherein the debugging logic does not change the trace buffer and does not change the memory image.

15. A computer program as recited in claim 14, further comprising a code segment that halts the recording of program information and the capturing of the memory image at a same time.

16. A computer program as recited in claim 15, further comprising a code segment that maintains a program counter (PC) register corresponding to program information read from the trace buffer during simulated execution of the application program.

17. A computer program as recited in claim 16, wherein the debugging logic is detected by determining during simulated execution when the PC register corresponds to a location in source code at which the debugging logic was inserted, the source code corresponding to the application program.

18. A computer program as recited in claim 14, further comprising a code segment that compiles the debugging logic to a location separate from the memory image and the trace buffer, the debugging logic being executed from the location.

19. A computer program as recited in claim 14, further comprising a code segment that interprets the debugging logic upon detection during simulated execution.

20. A computer program as recited in claim 14, further comprising a code segment that writes before-modification values of program information from the trace buffer to associated locations in the memory image to simulate backward application execution, and a code segment that writes after-modification values of program information from the trace buffer to associated locations in the memory image to simulate forward application execution.

* * * * *